US006478554B1

United States Patent
Dinkel et al.

(10) Patent No.: US 6,478,554 B1
(45) Date of Patent: Nov. 12, 2002

(54) HYDRAULIC UNIT

(75) Inventors: Dieter Dinkel, Eppstein (DE); Stephan Risch, Weiterstadt (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/743,943

(22) PCT Filed: Jul. 5, 1999

(86) PCT No.: PCT/EP99/04664

§ 371 (c)(1),
(2), (4) Date: Mar. 29, 2001

(87) PCT Pub. No.: WO00/03902

PCT Pub. Date: Jan. 27, 2000

(30) Foreign Application Priority Data

Jul. 16, 1998 (DE) .......................... 198 31 844
Nov. 10, 1998 (DE) .......................... 198 51 762

(51) Int. Cl.⁷ .................................. F04B 35/01
(52) U.S. Cl. ................... 417/415; 417/273; 417/572; 417/313; 92/86; 92/82; 239/589
(58) Field of Search ................... 417/415, 273, 417/572, 313; 92/86, 82; 239/589

(56) References Cited

FOREIGN PATENT DOCUMENTS

| DE | 32 22 149 | 11/1983 | | |
|---|---|---|---|---|
| DE | 42 01 146 | 7/1992 | | |
| DE | 43 21 571 | 1/1994 | | |
| DE | WO 94 12375 | * | 6/1994 | ............. B60T/8/36 |
| DE | 43 42 732 | 6/1995 | | |
| DE | 44 16 991 | 11/1995 | | |
| DE | WO 96 13416 | * | 5/1996 | ............. B60T/8/36 |
| DE | 196 19 381 | 11/1997 | | |
| DE | 196 23 595 | 12/1997 | | |
| DE | 197 46 889 | 5/1998 | | |
| DE | 197 51 935 | 5/1999 | | |
| EP | 0 758 601 | 2/1997 | | |
| JP | 0770 530 A2 | * | 2/1997 | ............. B60T/8/36 |

* cited by examiner

Primary Examiner—Cheryl J. Tyler
Assistant Examiner—Emmanuel Sayoc
(74) Attorney, Agent, or Firm—Rader, Fishman & Grauer PLLC

(57) ABSTRACT

The invention relates to a hydraulic unit for a hydraulic control and/or regulating device, in particular for anti-blocking and/or anti-slipping brake systems, comprising control and regulating electronics arranged in a control housing as well as a valve block connected to said control housing, whereby at least one driving means is provided for at least one pressure-generating element. A cavity associated with the pressure-generating element receives leakage fluid from the pressure-generating element and a discharge channel that is connected to the cavity is provided in the valve block. According to the present invention, a means is associated with the discharge channel, and said means prevents fluid from entering into the discharge channel.

9 Claims, 5 Drawing Sheets

HYDRAULIC UNIT

TECHNICAL FIELD

The present invention generally relates to vehicle brake systems and more particularly relates to a hydraulic unit for a hydraulic control and/or regulating device for anti-lock and/or anti-slipping brake systems.

BACKGROUND OF THE INVENTION

DE 42 34 013 A1 discloses a hydraulic unit of the type described above. The most recent hydraulic units have a modular design and essentially comprise such hydraulic components as pump, low-pressure accumulator, solenoid valves and a driving means for the pump. Integrated coils arranged in the electronic control housing are attached directly to the solenoid valves and fastened to the valve block. For this purpose, an eccentric driven by the drive shaft of a driving means is provided in the valve block, and it actuates the pressure-generating elements. The pressure-generating elements are sealed off against the cavity of the eccentric by means of elastic seals; however, leakages cannot always be avoided at pressure levels up to 250 bar. Therefore, a discharge channel is provided in the valve block, so that the leakage fluid of the pressure-generating elements can flow off. The leakage fluid flows through the discharge channel to the outer wall of the valve block, to which the control housing is fastened. Now the hydraulic unit should be installed in such locations and positions that the specifications regarding the operativeness of the brake system, for example a splash-water test, can be met. However, due to the complex arrangement of units in the complete motor vehicle and the high integration density of the systems in the motor vehicle, this cannot always be fulfilled. Salt or water entering into the valve, pump, engine and pressure accumulator spaces collects in the cavities and, in some cases, may lead to overflowing. Malfunctions cannot be completely eliminated. Special measures, which generally render the unit more expensive, are necessary to ensure operativeness.

In order to counteract these circumstances, the control housing commonly is sealed off against the valve block by means of a seal which is fixed in place in a recess in the controller wall in a usual manner.

Consequently, this leads to a sealed surface extending over the entire valve block, the operativeness of which can only be ensured with great difficulty. Furthermore, such a unit has to be ventilated and deaerated, which increases the unit's cost.

Hence, the object of the present invention is to disclose a hydraulic unit that safely prevents a fluid from entering into the discharge channel and, at the same time, allows the leakage fluid to flow off from the discharge channel and the control housing.

Hence, this invention is based on the concept of connecting the valve block and control housing without any seal in-between, so as to fasten the control housing to the valve block in a simpler and less expensive manner, and to this end a means arranged within the housing space and associated with the discharge channel for preventing the leakage fluid prevents a fluid, e.g. water, from entering into the discharge channel.

The present invention includes a protective element that at least partially surrounds the discharge opening and diverts the fluid from the discharge opening. This gives rise to two particularly simple ways of producing the necessary means. One particularly reliable, easy-to-install and low-cost solution to the existing problem is described herein. In this case, the leakage fluid preventing means is connected in one piece to the control housing made of a plastic material. The roof-like means, under pretension, is moved into abutment with the wall of the valve block in the direction of infiltration of the fluid upstream of the outlet of the discharge channel and guides the fluid into the control housing. In this configuration, the means can be formed by means of injection moulding during production of the control housing.

In an alternative configuration of the leakage fluid preventing means, wherein this means is connected separably to the valve block. Preferably, the means is pipe-shaped and connects the discharge channel to an interior space of the control housing in which the coils of the brake system are arranged. The pipe-shaped means carries out two functions: it guides the leakage fluid to the interior space of the control housing and prevents infiltration of fluid, since the outlet of the pipe-shaped means is located inside the control housing and the fluid flows between control housing and valve block.

Whenever necessary, the discharge channel can be connected to a reservoir via the leakage fluid preventing means, whereby leakage fluid can be collected in the reservoir. For this purpose, an absorbent medium, whose surface does not allow infiltration of fluid with low viscosity, can be used for absorbing the fluid.

These measures take into consideration the daily requirements arising later during operation, since the leakage fluid is not discharged through the engine chamber of a motor vehicle, which could be misinterpreted by the user of the motor vehicle.

A particularly simple way of installing and removing the leakage fluid preventing means is disclosed wherein the means is positioned in the discharge channel. This can be implemented particularly easily and at low cost in the pipe-shaped configuration, provided the diameter of the means corresponds to the diameter of the discharge channel. This is particularly cost-efficient when a plastic pipe that can be inserted in the discharge channel is used.

Also disclosed in the present invention is a means equipped with a valve safely prevents infiltration of a fluid if necessary. It would be appropriate to provide drip-off edges on the means, so that the fluid can be discharged at a specified position. Consequently, a defined flow of fluid can be ensured. When a section of the means extends at an angle, the leakage fluid can be discharged precisely to a defined position within the control housing and infiltration of a fluid corresponding to the position of installation of the hydraulic unit is definitely prevented. In an advantageous embodiment a control housing of the type described above exhibits means connected to it in one piece, which prevents fluid from entering into the discharge channel of a valve block. A means for the discharge channel of a hydraulic unit, which is pipe-shaped, can be advantageously produced as a separate single part and assembled as a purchased part.

Other objectives, characteristics, advantages and application possibilities of the present invention are stated in the following descriptions of embodiments. In this connection, all described and/or illustrated characteristics form the object of the invention either by themselves or in any meaningful combination, irrespective of how they are combined in the claims or appendencies.

DETAILED DESCRIPTION OF THE PREFERRED EMBODIMENTS

Figure 1:
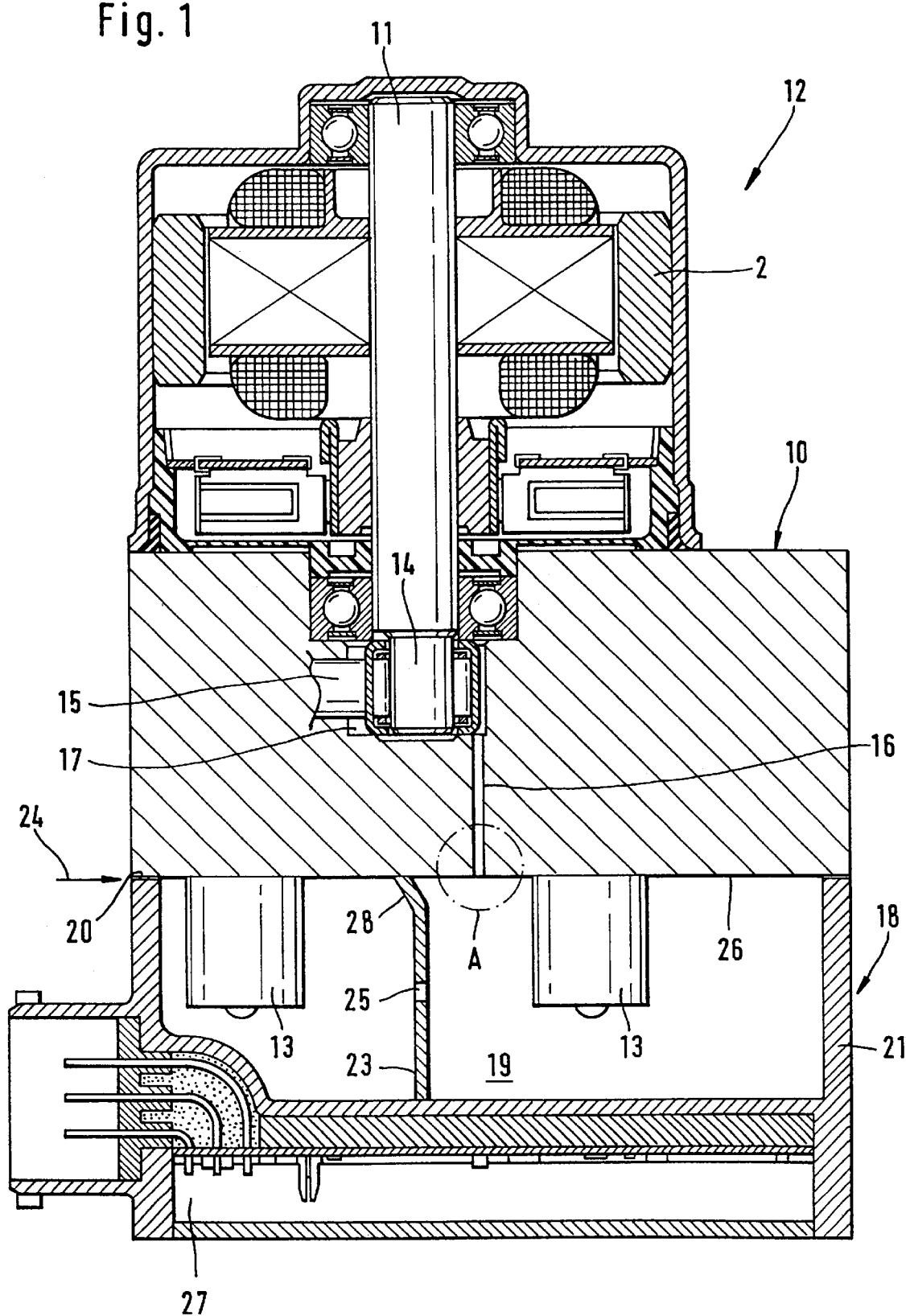
FIG. 1 shows a discharge channel arranged in the valve block and ending in the interior space of the control housing, to which is associated a means that is connected to the control housing in one piece for the purpose of letting off a fluid.

FIG. 1 shows a hydraulic unit and a section of valve block 10 for holding driving means 12, valve elements 13 and pressure-generating elements 15 of a pump, which are not shown in detail. Driving means 12 consists of a d.c. motor, whose rotor is held in a bearing at an end of the shaft in a pot-shaped housing and whose other bearing is guided in a blind hole of valve block 10. This bearing for shaft 11 of driving means 12 is close to the eccentric pin of the shaft 14, which exhibits a needle bearing to actuate at least one piston-shaped pressure-generating element 15. A discharge channel 16 with a small diameter is connected to the bearing of driving means 2 in valve block 10. This discharge channel 16 is used to let off leakage fluid entering into cavity 17 from pressure-generating element 15 to the surface 26 of valve block 10. A control housing 18 is connected to this surface 26 of valve block 10, which encases valve elements 13 in such a way that there is still ventilation. Interior space 19 is designed to hold electric or electronic components. The interior space designed for holding valve elements 13 is dish-shaped and is connected to the ambient medium via the uneven mounting surface 20 of wall 21. The space 27 holding the electric or electronic components is impermeable for any fluid coming from interior space 19, so that infiltration of fluid into the humidity-sensitive and dirt-sensitive area of the control housing is prevented under all operating conditions. The leakage fluid flowing off from cavity 17 is taken up by interior space 19 and can flow off through the leaky mounting surface 20 between control housing 18 and valve block 10.

In particular when the hydraulic unit is installed in a horizontal or angled position in relation to the axis of the engine, the surface of the hydraulic unit acts as a collecting element that guides such fluids as water or water with additives directly to mounting surface 20. In this connection, large flows of fluids may occur, which flow along the surface of the valve block into interior space 19 and in the direction of discharge channel 16 which preferably extends vertically to the surface.

A means 23 designed as a web in the interior space 19 is connected in one piece to the control housing. The wall-shaped or roof-like web exhibits a section extending under an angle 28 in the direction of surface 26, which abuts against surface 26 of valve block 10. By choosing a corresponding thickness for the means 23, the longitudinal axis of means 23 exhibits an elasticity that causes means 23 to be pre-tensioned along section 28 which protrudes from wall 21 of control housing 18 when the control housing is attached to surface 26. The means 23 with section 28 firmly abuts against surface 26 of valve block 10 and guides the fluid flowing in the direction of flow 24 from the surface 26 of valve block 10 to an opening 25 provided in means 23. The fluid flows through this opening 25 in a defined manner to the opposite mounting surface 20 of wall 21 and off via the mounting surface 20. Special discharge openings that are connected to such discharge elements as discharge tubes, which are not shown in detail, allow the leakage fluid to be transported to a defined position in the motor vehicle.

Means 23 ensures that the fluid cannot enter into discharge channel 16 for the leakage fluid, since it is let off via means 23. Discharge channel 16 can be arranged perpendicular to surface 26 in valve block 10 through means 23.

The wall-shaped web 23 shown in FIG. 1 can also be pipe-shaped and surround discharge channel 16, an embodiment not shown in detail. In this case, discharge channel 16 would be protected against the infiltration of fluid irrespective of the position of installation of the hydraulic unit, since said fluid would then be let off definitely irrespective of the direction of flow 24.

Section A of FIG. 1 is enlarged in FIGS. 2 to 8. It is a schematic representation of alternative embodiments of means 23.

Figure 2:
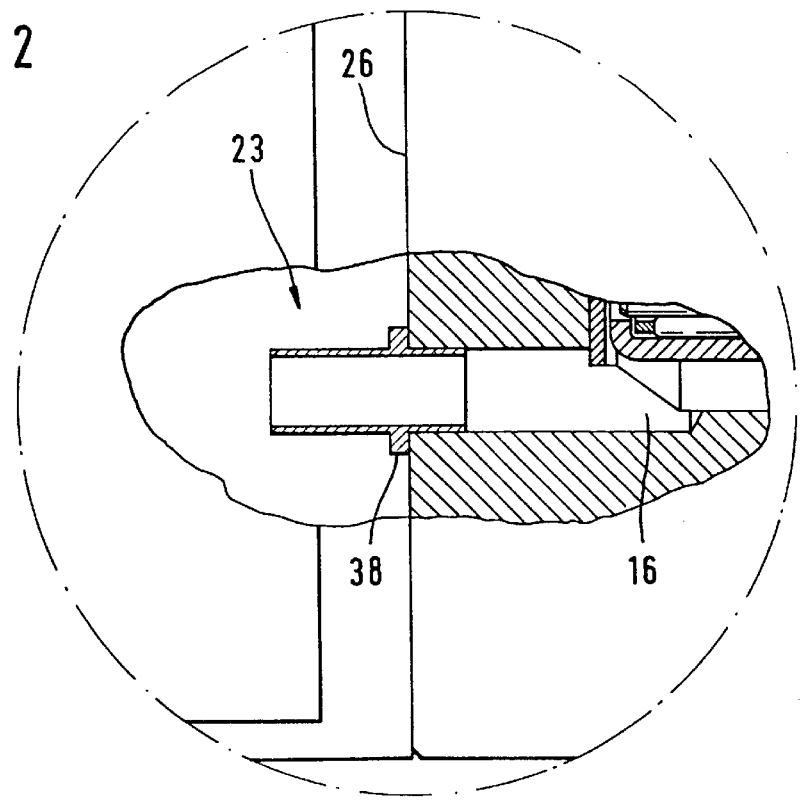
FIG. 2 is an alternative embodiment with a pipe-shaped means positioned in the discharge channel.

As an alternative to FIG. 1, however with basically the same function at valve block 10, FIG. 2 shows a modification of means 23, wherein, contrary to FIG. 1, a pipe-shaped means 23 is positioned with form-fit but separably in discharge channel 16. Thus, discharge channel 16 advantageously is extended into interior space 19 of control housing 18. The means 23, which is designed as a pipe with application element 38, leads the leakage fluid from discharge channel 16 to interior space 19 and prevents fluid from entering into discharge channel 16, since application element 38 and the protruding section of means 23 divert the fluid flowing along surface 26 from discharge channel 16, causing it to flow around the pipe to mounting surface 20 of control housing 18. If necessary, a sealing element can be provided between the application flange and surface 26, or application element 38 itself can be designed as a sealing element, e.g. through an appropriate surface pressure between surface 26 and application element 38. The pipe-shaped means 23 is connected to discharge channel 16 by means of a press fit or it is glued in.

Figure 3:
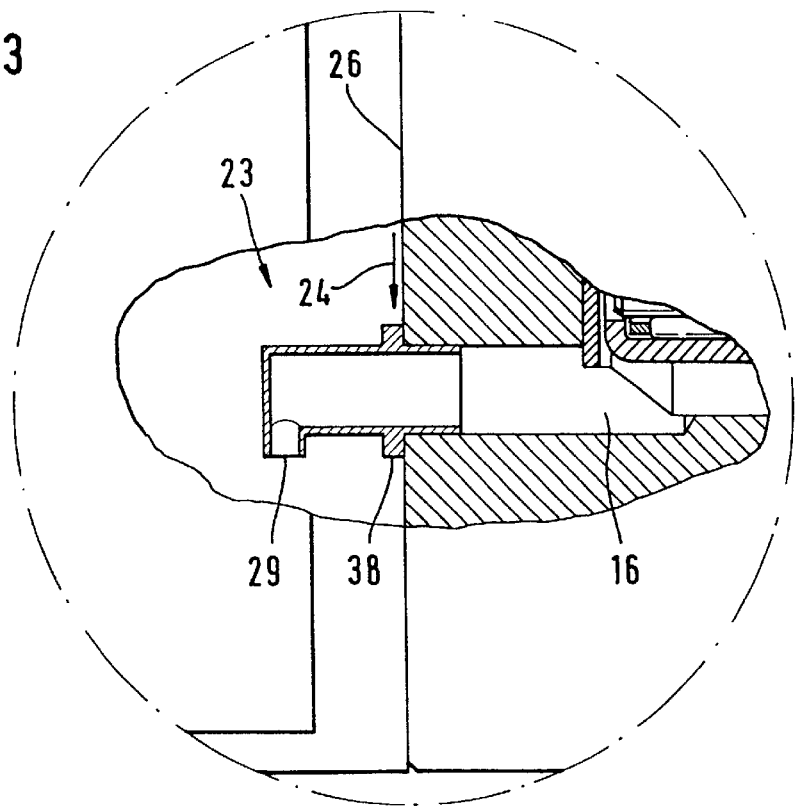
FIG. 3 is an alternative embodiment of FIG. 2 with an angled pipe-shaped means.

FIG. 3 shows a pipe-shaped means 23 corresponding to FIG. 2; however, with the difference that outlet 29 ending in interior space 19 extends under an angle, preferably parallel to surface 26. Due to the angled outlet 29, leakage fluid is led in a definite manner to a section of interior space 19 of control housing 18 and infiltration of a fluid, especially in connection with a direction of flow 24 dependent on the installation position of the hydraulic unit, is definitely prevented, since even large quantities of fluid are diverted around the pipe-shaped means 23 and flow off from the edges of outlet 29.

Figure 4:
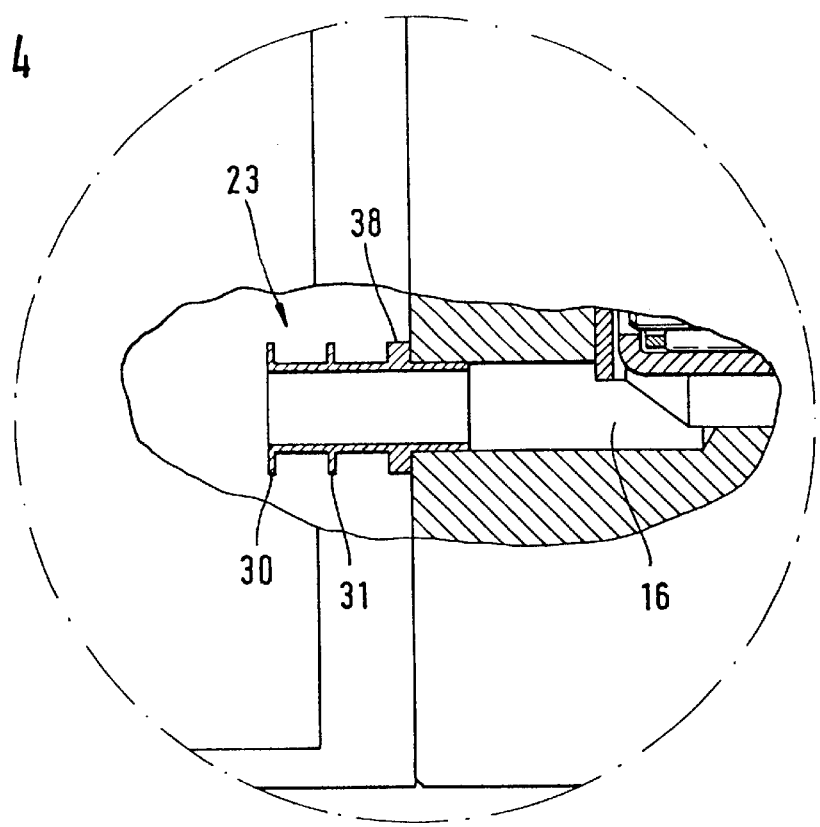
FIG. 4 is an alternative embodiment of FIG. 2 with a pipe-shaped means exhibiting drip-off edges.

In FIG. 4, the pipe-shaped means shown in FIG. 2 has drip-off edges 30, 31, which preferably are arranged at specified distances along the circumference of the pipe-shaped means 23. The drip-off edges 30 and 31 cause the fluid to flow off from means 23 in a systematic manner.

Figure 5:
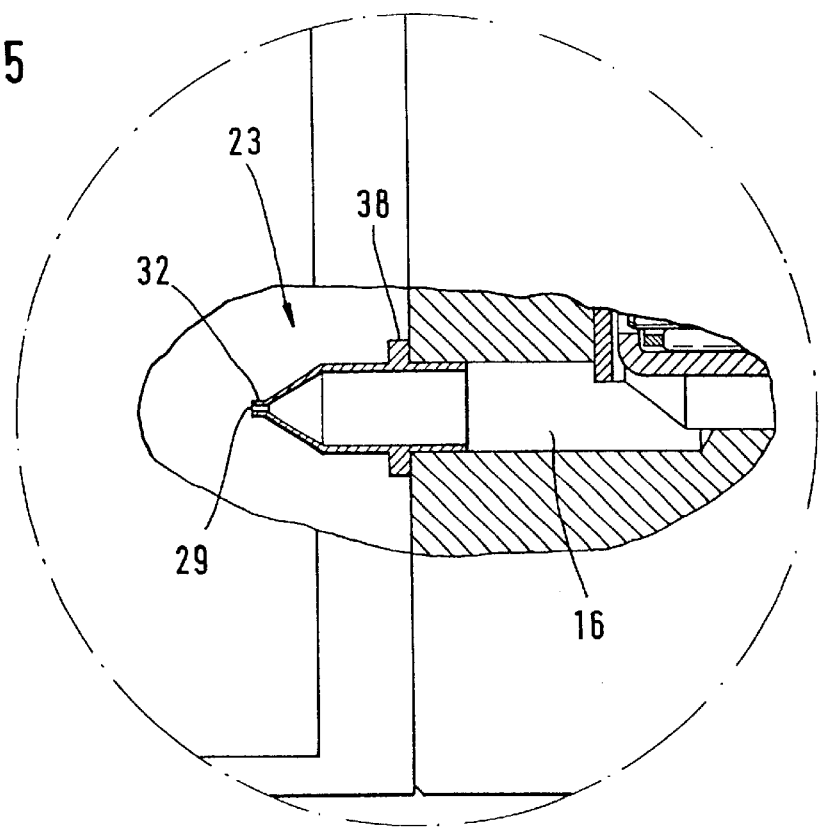
FIG. 5 is an alternative embodiment of FIG. 1 with a means exhibiting a reducing fitting.

FIG. 5 shows an alternative embodiment of FIG. 2, which is distinguished from the embodiment shown in FIG. 2 in that a shut-off device is provided at outlet 29. Shut-off device 32 is designed as a reducing fitting, which reduces the cross-section of outlet 29 and, hence, prevents infiltration of a fluid.

Figure 6:
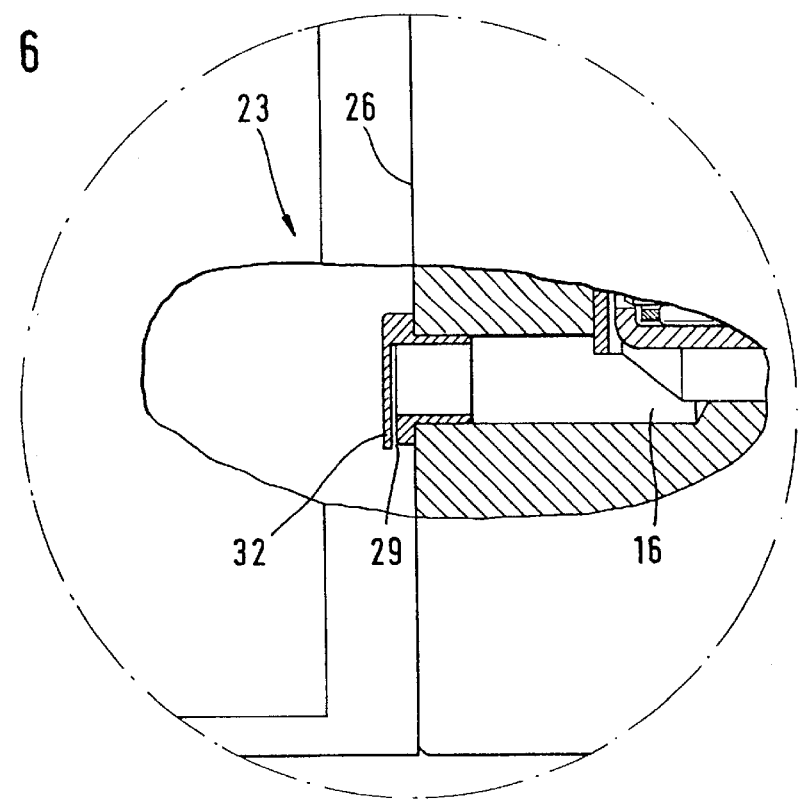
FIG. 6 is an alternative embodiment of FIG. 1 with a pipe-shaped means that extends at an angle.

In FIG. 6 the outlet is designed as a gap or labyrinth, which is configured under an angle, preferably with an outlet 29 extending parallel to surface 26.

Figure 7:
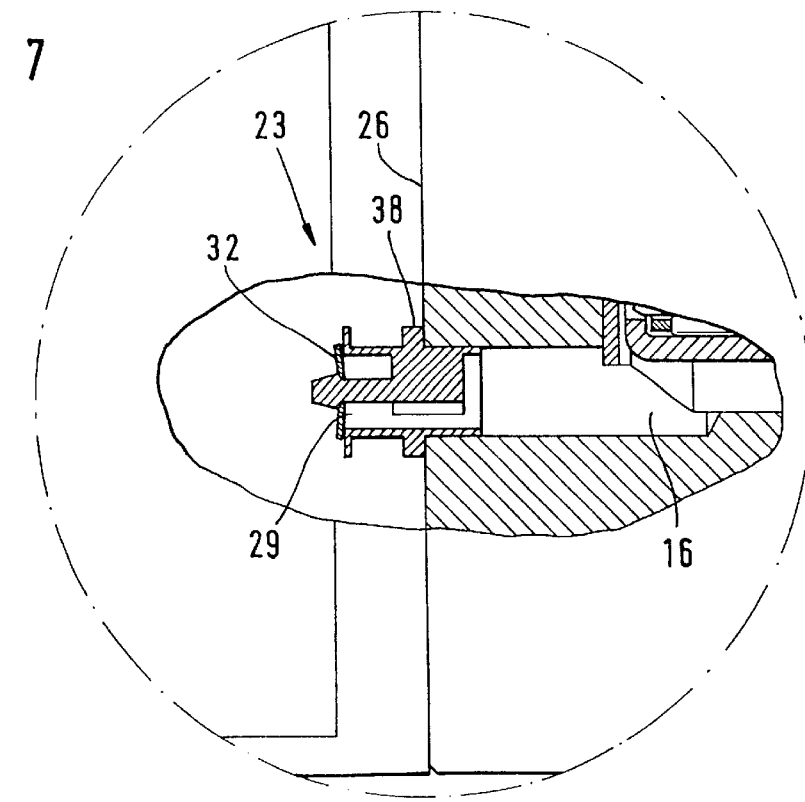
FIG. 7 is an alternative embodiment of FIG. 2 with a valve provided in the means.

FIG. 7 shows another alternative embodiment to FIG. 1, in which the pipe-shaped means 23 is equipped with a shut-off device 32 that is designed as a valve. Preferably the shut-off device 32 is a return valve, allowing leakage fluid to run off into interior space 19 and, at the same time, preventing infiltration of a fluid flowing along surface 26.

Figure 8:
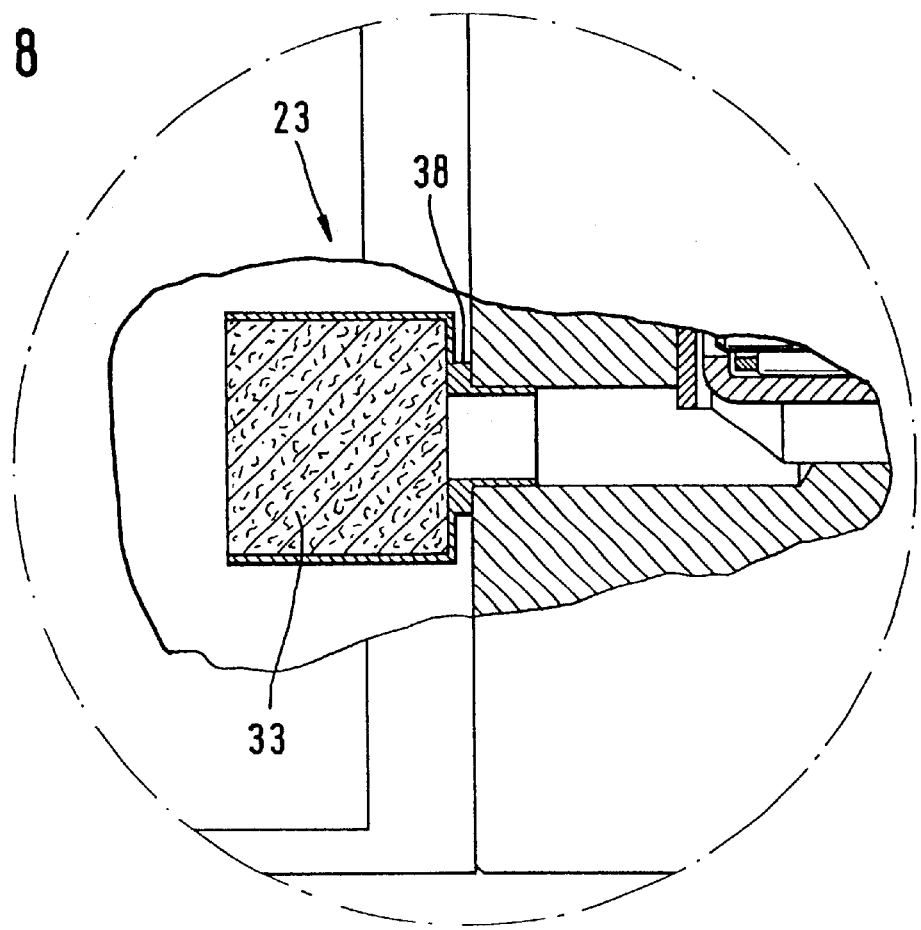
FIG. 8 is an alternative embodiment of FIG. 2 with a reservoir attached to the means.

In FIG. 8 the pipe-shaped means 23 is connected to a reservoir for collecting leakage fluid. Preferably an absorbent medium (felt or similar), whose surface is impregnated to make it impermeable for fluid towards the outside, is used for absorbing the fluid.

What is claimed is:

1. A hydraulic unit for a hydraulic control for anti-lock or anti-slipping brake systems, comprising:

control and regulating electronics arranged in a control housing, a valve block connected to the control housing, at least one driving means provided for at least one pressure-generating element on the valve block, a cavity associated with the pressure-generating element, wherein said cavity takes up leakage fluid from the pressure-generating element, and a discharge channel connected to the cavity, means for diverting aqueous fluids away from said cavity through said discharge channel and into an interior space defined by said control housing.

2. A hydraulic unit according to claim 1, wherein the diverting means is connected in one piece to the control housing.

3. A hydraulic unit according to claim 1, wherein the diverting means is connected separately to the valve block.

4. A hydraulic unit according to claim 1, wherein the diverting means is pipe-shaped and connects the discharge channel with an interior space of the control housing.

5. A hydraulic unit according to claim 1, wherein the discharge channel is connected to a reservoir by way of the diverting means.

6. A hydraulic unit according to claim 1, wherein the diverting means is disposed in the discharge channel.

7. A hydraulic unit according to claim 1, wherein the diverting means includes a shut-off device.

8. A hydraulic unit according to claim 1, wherein the diverting means includes at least one drip-off edge.

9. A hydraulic unit according to claim 1, wherein the diverting means includes a section extending under an angle.

* * * * *